United States Patent Office 2,712,032
Patented June 28, 1955

2,712,032

PRODUCTION OF OXIMES

Otto von Schickh, Ludwigshafen (Rhine), Germany, assignor to Badische Anilin- & Soda-Fabrik Aktiengesellschaft, Ludwigshafen (Rhine), Germany No Drawing. Application December 16, 1952,
Serial No. 326,341

Claims priority, application Germany December 21, 1951

4 Claims. (Cl. 260—566)

This invention relates to an improved process for the production of oximes from nitroalkanes or nitrocycloalkanes.

I have found that oximes are obtained by reacting aqueous solutions of salts of nitroalkanes or nitrocycloalkanes at room or moderately lowered or raised temperature, while maintaining a pH-value between about 1.5 and 3.5, with mineral acids, preferably in the presence of salts, in particular ammonium salts.

As nitroalkanes there are suitable for example 2-nitropropane or -octane, nitrocyclohexane, the methylnitrocyclohexanes, nitrocyclopentane or -octane. Their alkali metal, alkaline earth metal or ammonium salts are used, as for example their solutions in caustic alkali solutions or in aqueous ammonia or amine solutions.

The most favourable pH-values lie at about pH=2. As salts which may preferably be added there are suitable for example sodium sulfate, ammonium sulfate, ammonium chloride, ammonium phosphate or cyclohexylammonium sulfate.

It is preferable to proceed by adjusting an aqueous sulfuric acid solution to a pH value of about 2, and preferably saturating it with salts, in particular ammonium sulfate, and then allowing to flow in simultaneously an aqueous solution of a salt of the nitroalkane or nitrocycloalkane and sufficient sulfuric acid to maintain a pH value of 2 in the reaction mixture.

In this way there are obtained aqueous-acid solutions which contain the acid salt of the oxime in question. By raising the pH value to about 4 to 5, the oxime is set free therefrom.

The course of the reaction is not yet clearly understood.

The following examples will further illustrate this invention but the invention is not limited to these examples. The parts are by weight.

Example 1

Into a solution of 66 parts of ammonium sulfate in 100 parts of water, which has been adjusted to a pH value of 2 with sulfuric acid, there is allowed to flow while stirring a solution of 129 parts of nitrocyclohexane in the equivalent amount of 10% caustic soda solution and at the same time dilute sulfuric acid at such a rate that the pH value of the reaction mixture is kept at about the pH value=2. Such an amount of caustic soda solution or ammonia is then introduced that the pH value rises to 4 to 5 and the mixture is then extracted with ether, the ethereal extract shaken with dilute hydrochloric acid and the hydrochloric acid solution then again rendered alkaline. 47 parts of cyclohexanone oxime having the melting point 89° to 90° C. are thus obtained. 45 parts of cyclohexanone are also obtained by evaporating off the ether.

Example 2

Into 400 parts of a 25% sodium sulfate solution which has been adjusted to the pH value 2 with sulfuric acid there is allowed to flow while stirring a solution of 129 parts of nitrocyclohexane in the equivalent amount of 10% caustic soda solution and at the same time dilute sulfuric acid at such a rate that the pH value of the reaction mixture is kept at about pH=2. After working up as in Example 1, 26 parts of cyclohexanone oxime having the melting point 89° C. as well as 65 parts of cyclohexanone are obtained.

If, instead of nitrocyclohexane, the equivalent amount of nitrocyclooctane or -pentane be used, there are obtained cyclooctanone- and cyclopentanone-oximes, respectively, in analogous amounts.

Example 3

A solution of 45 parts of 2-nitropropane in the equivalent amount of 10% caustic soda solution is gradually stirred at room temperature into a solution of 33 parts of ammonium sulfate in 50 parts of water which has been adjusted with hydrochloric acid to the pH value 3, care being taken by the simultaneous addition of further hydrochloric acid that the pH value of the reaction mixture always amounts to about 3. When the whole of the alkaline 2-nitropropane solution has been introduced, the acid reaction mixture is neutralised with caustic soda solution. By extraction with ether, drying the ether extract with sodium sulfate and evaporating the ether, 14 parts of pure acetone oxime having the melting point 60° C. are obtained.

If, instead of 2-nitropropane, equivalent amounts of a mixture of isomeric nitrooctanes be used, there is obtained a mixture of the corresponding aliphatic oximes.

I claim:

1. A process for the production of an about equivalent mixture of ketones and the corresponding ketoximes by disproportionating secondary nitro compounds which comprises introducing an aqueous solution of a member of the group consisting of alkali, alkaline earth metal and ammonium salts of secondary lower mononitroalkanes and monocyclic mononitrocycloalkanes containing up to 8 carbon atoms into acidified aqueous solutions of water-soluble salts selected from the group consisting of alkali and ammonium sulfates, chlorides and phosphates while maintaining a pH value between about 1.5 and 3.5 in the reaction mixture.

2. A process for the production of an about equivalent mixture of cyclohexanone and its oxime by disproportionating nitrocyclohexane which consists in introducing a solution of nitrocyclohexane in the about equivalent amount of caustic soda solution into an acidified aqueous solution of ammonium sulfate while maintaining a pH value of about 2 in the reaction mixture.

3. A process for the production of an about equivalent mixture of cyclohexanone and its oxime by disproportionating nitrocyclohexane which consists in introducing a solution of nitrocyclohexane in the about equivalent amount of caustic soda solution into an acidified aqueous solution of sodium sulfate while maintaining a pH value of about 2 in the reaction mixture.

4. A process for the production of an about equivalent mixture of cyclooctanone and its oxime by disproportionating nitrocyclooctane which consists in introducing a solution of nitrocyclooctane in the about equivalent amount of aqueous caustic soda solution into an acidified aqueous solution of sodium sulfate while maintaining a pH value of 2 in the reaction mixture.

References Cited in the file of this patent

FOREIGN PATENTS

| 171,709 | Austria | Jan. 25, 1952 |
| 499,518 | Belgium | Dec. 15, 1950 |
| 502,123 | Belgium | Apr. 14, 1951 |